US010883319B2

(12) United States Patent
Sugino et al.

(10) Patent No.: US 10,883,319 B2
(45) Date of Patent: Jan. 5, 2021

(54) THREADED CONNECTION FOR STEEL PIPE

(71) Applicants: Nippon Steel & Sumitomo Metal Corporation, Tokyo (JP); Vallourec Oil and Gas France, Aulnoye-Aymeries (FR)

(72) Inventors: Masaaki Sugino, Tokyo (JP); Sadao Douchi, Tokyo (JP); Yasuhiro Yamamoto, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 400 days.

(21) Appl. No.: 15/768,379

(22) PCT Filed: Oct. 13, 2016

(86) PCT No.: PCT/JP2016/080321
§ 371 (c)(1),
(2) Date: Apr. 13, 2018

(87) PCT Pub. No.: WO2017/069030
PCT Pub. Date: Apr. 27, 2017

(65) Prior Publication Data
US 2018/0313168 A1  Nov. 1, 2018

(30) Foreign Application Priority Data
Oct. 21, 2015  (JP) .................................. 2015-207145

(51) Int. Cl.
*F16L 15/04* (2006.01)
*E21B 17/042* (2006.01)
*F16L 15/06* (2006.01)

(52) U.S. Cl.
CPC ............ *E21B 17/042* (2013.01); *F16L 15/04* (2013.01); *F16L 15/06* (2013.01)

(58) Field of Classification Search
CPC .......... F16L 15/04; F16L 15/06; E21B 17/042
See application file for complete search history.

(56) References Cited

U.S. PATENT DOCUMENTS 1,973,848 A * 9/1934 Duffy ................. E21B 17/0423
285/333
3,508,771 A   4/1970 Duret
(Continued)

FOREIGN PATENT DOCUMENTS

CA       2934937 A1    7/2015
CN    101438089 A    5/2009
(Continued)

OTHER PUBLICATIONS

English Abstract & Family List corresponding to CN101438089A.
(Continued)

*Primary Examiner* — David Bochna
(74) *Attorney, Agent, or Firm* — Banner & Witcoff, Ltd.

(57) ABSTRACT

A threaded connection for steel pipe with improved sealing performance is provided. A threaded connection (1) for steel pipe includes a pin (10) and a box (20). The outer diameter of the box (20) is smaller than 108% of the outer diameter of a steel-pipe body (30). The pin (10) includes a pin lip (12) including a first seal surface (11), a male thread (13) constituted by a single-stage tapered thread, and a second seal surface (14). The box (20) includes a first seal surface (21), a female thread (23) constituted by a single-stage tapered thread, and a box lip (22) including a second seal surface (24). When assembled, the first seal surfaces (11, 21) are in contact with each other and the second seal surfaces (14, 24) are in contact with each other. A portion of the male thread (13) located near the end thereof close to the pin lip (Continued)

(12) includes a plurality of thread root surfaces extending parallel to the pipe axis (CL) and having the same diameter. A portion of the female thread (23) located near the end thereof close to the box lip (22) includes a plurality of thread root surfaces extending parallel to the pipe axis (CL) and having the same diameter.

6 Claims, 11 Drawing Sheets

(56) References Cited

U.S. PATENT DOCUMENTS

| | | | |
|---|---|---|---|
| 3,572,777 | A | 3/1971 | Blose et al. |
| 3,994,516 | A * | 11/1976 | Fredd ................ E21B 17/0423 285/333 |
| 4,161,332 | A | 7/1979 | Blose |
| 4,494,777 | A | 1/1985 | Duret |
| 4,568,113 | A * | 2/1986 | Axford ................ F16L 15/001 285/334 |
| 4,616,537 | A * | 10/1986 | Axford ................ E21B 17/042 470/176 |
| 4,917,409 | A | 4/1990 | Reeves |
| 5,687,999 | A | 11/1997 | Lancry et al. |
| 6,595,557 | B2 | 7/2003 | Hignett |
| 7,494,159 | B2 | 2/2009 | Sugino et al. |
| 2007/0029797 | A1 | 2/2007 | Santi et al. |
| 2012/0043756 | A1 | 2/2012 | Elder et al. |
| 2013/0015657 | A1 | 1/2013 | Elder et al. |
| 2015/0252921 | A1 | 9/2015 | Schulte et al. |
| 2016/0305585 | A1 * | 10/2016 | Inose ................ F16L 15/06 |

FOREIGN PATENT DOCUMENTS

| | | |
|---|---|---|
| CN | 102770698 A | 11/2012 |
| EP | 0767335 A1 | 4/1997 |
| JP | S6347588 A | 2/1988 |
| JP | H10280886 A | 3/1990 |
| JP | H10231271 B2 | 7/1990 |
| JP | H1113728 A | 1/1999 |
| JP | 2002524712 A | 8/2002 |
| JP | 3426600 B2 | 7/2003 |
| JP | 2009531603 A | 9/2009 |
| JP | 2012030349 A | 2/2012 |
| JP | 2013507588 A | 3/2013 |
| WO | 9908034 A1 | 2/1999 |
| WO | 0008370 A1 | 2/2000 |
| WO | 2009044851 A1 | 4/2009 |

OTHER PUBLICATIONS

English Abstract & Family List corresponding to CN102770698A.
Apr. 23, 2019 (EP) Extended European Search Report App. 16857345.9.

* cited by examiner

THREADED CONNECTION FOR STEEL PIPE

RELATED APPLICATION DATA

This application is a National Stage Application under 35 U.S.C. 371 of co-pending PCT application number PCT/JP2016/080321 designating the United States and filed Oct. 13, 2016; which claims the benefit of JP application number 2015-207145 and filed Oct. 21, 2015 each of which are hereby incorporated by reference in their entireties.

BACKGROUND

Technical Field

The present disclosure relates to a threaded connection used to connect steel pipes.

Description of the Background Art

In oil wells, natural gas wells etc. (hereinafter collectively referred to as "oil wells"), oil country tubular goods such as casing and tubing are used to mine underground resources. Oil country tubular goods are often steel pipes, and the steel pipes are connected by threaded connections.

Such threaded connections for steel pipe are generally categorized as coupling-type and integral-type. A coupling-type connection connects a pair of pipes, where one of the pipes is a steel pipe and the other pipe is a coupling. In this case, a male thread is formed on the outer periphery of both ends of the steel pipe, while a female thread is formed on the inner periphery of both ends of the coupling. Then, the male thread of the steel pipe is screwed into the female thread of the coupling such that they are assembled and connected. An integral-type connection connects a pair of pipes that are both steel pipes, and does not use a separate coupling. In this case, a male thread is formed on the outer periphery of one end of a steel pipe, while a female thread is formed on the inner periphery of the other end. Then, the male thread of one steel pipe is screwed into the female thread of another steel pipe such that they are assembled and connected.

Generally, an end portion of a pipe that includes a male thread and serves as a connection portion is referred to as pin, since it includes an element to be inserted into the female thread. On the other hand, an end portion of a pipe that includes a female thread and serves as a connection portion is referred to as box, since it includes an element that receives the male thread. Since the pin and box are end portions of a pipe, they are tubular in shape.

An oil well is drilled along while its side wall is reinforced by oil country tubular goods to prevent the side wall from collapsing during digging, which results in multiple oil country tubular goods arranged in one another. In recent years, both on-land and offshore wells have become deeper and deeper; in such environments, threaded connections in which the inner and outer diameters of the connection portions are almost the same as the inner and outer diameters of the steel pipes are often used to connect oil country tubular goods, in order to develop oil wells efficiently. The use of such threaded connections minimizes the clearances between the oil country tubular goods arranged in one another, making it possible to efficiently develop a deep oil well without significantly increasing the diameter of the well. A threaded connection is required to have good sealing performance against a pressure fluid from the inside (hereinafter also referred to as "internal pressure") and a pressure fluid from the outside (hereinafter also referred to as "external pressure") under the above-described restrictions on the inner and outer diameters.

For example, in some known threaded connections that provide sufficient sealing performance, a seal portion is formed by metal-to-metal contact when assembled. The patent documents discussed below disclose threaded connections having such seal portions. A seal portion formed by metal-to-metal contact as used herein is one in which the diameter of the seal surface of the pin is slightly larger than the diameter of the seal surface of the box (the difference between these diameters will be referred to as interference) and, when the threaded connection is assembled such that the seal surfaces fit together, the interference reduces the diameter of the seal surface of the pin and increases the diameter of the seal surface of the box and the seal surfaces attempt to return to their original diameters with an elastic recovery force that generates a contact pressure on the seal surfaces such that they come to close contact with each other along the entire circumference, thereby exhibiting a sealing performance.

A threaded connection of JP Hei2(1990)-31271 A uses single-stage tapered threads as the thread assembly and includes an inner seal portion located close to the tip of the pin. This inner seal portion is composed of a seal surface provided on the tip of the pin and a seal surface provided on the box so as to correspond to the seal surface of the pin. In the threaded connection of JP Hei2(1990)-31271 A, when the pin and box are assembled, the seal surfaces fit together and in close contact with each other.

Similar to the threaded connection of JP Hei2(1990)-31271 A, a threaded connection of U.S. Pat. No. 4,494,777 uses single-stage tapered threads as the thread assembly. However, the threaded connection of U.S. Pat. No. 4,494,777 includes an outer seal portion in a region at the end of the pin located close to the steel-pipe body. The outer seal portion includes concave and convex surfaces provided on the end of the pin located close to the steel-pipe body, and convex and concave surfaces provided on the box to correspond to the concave and convex surfaces, respectively, on the pin. In the threaded connection of U.S. Pat. No. 4,494,777, the concave and convex surfaces on the pin are in contact with the convex and concave surfaces, respectively, on the box when the pin and box are assembled.

A threaded connection of Japanese Patent No. 3426600 uses double-stage tapered threads as the thread assembly, and includes a seal portion between the two stages of the tapered thread. The seal portion is constituted by shoulder structures centrally located on the pin and box. The surface of each shoulder structure has the shape of a reversed "S" in a vertical cross section. Thus, in the threaded connection of Japanese Patent No. 3426600, the shoulder structures contact and engage each other when the pin and box are assembled.

Each of the threaded connections of U.S. Patent Application Publication No. 2012/0043756 and U.S. Pat. No. 5,687,999 uses double-stage tapered threads as the thread assembly, and includes an inner seal portion and an outer seal portion in a region at the tip of the pin and a region at the end located close to the steel-pipe body, respectively. The inner seal portion includes a seal surface provided on a tip portion of the pin and a seal surface provided on the box to correspond to that seal surface. The outer seal portion includes a seal surface provided on an end portion of the pin located close to the steel-pipe body and a seal surface provided on the box to correspond to that seal surface. In the threaded connections of U.S. Patent Application Publication No. 2012/0043756 and U.S. Pat. No. 5,687,999, the corresponding seal surfaces are in contact with each other when the pin and box are assembled.

DISCLOSURE OF THE INVENTION

For example, threaded connections are available which are known as flush-type, semi-flush-type and slim-type connections (hereinafter collectively referred to as "slim-type" connections) where the difference between the outer diameter of the box and the outer diameter of the steel-pipe body is small. In slim-type threaded connections, the inner diameters and outer diameters are strictly limited. As such, if seal portions are provided on end portions of a slim-type threaded connection, the portions of the pin and/or box that include the seal portions have relatively small wall thicknesses.

The threaded connection of JP Hei2(1990)-31271 A includes only an inner seal portion provided in a region at the tip of the pin. In this arrangement, when an internal pressure is applied to the threaded connection, the tip of the pin is pressed toward the box, which helps maintain sealing performance against the internal pressure. On the other hand, when an external pressure is applied to the threaded connection, some of the external pressure penetrates the interior of the connection through clearances between the threads and pushes down the tip of the pin, which has a thin wall thickness, such that radial clearances can be easily created between the pin and box at the inner seal portion. This makes it difficult to provide a certain sealing performance against an external pressure with the threaded connection of JP Hei2(1990)-31271 A.

The threaded connection of U.S. Pat. No. 4,494,777 includes only an outer seal portion provided in a region at the end of the pin located close to the steel-pipe body. In this arrangement, when an external pressure is applied to the threaded connection, the tip of the box is pressed toward the pin, which helps maintain sealing performance against the external pressure. On the other hand, when an internal pressure is applied to the threaded connection, some of the internal pressure penetrates the interior of the connection through clearances between the threads and pushes up the tip of the box, which has a thin wall thickness, such that radial clearances can be easily created between the pin and box at the outer seal portion. This makes it difficult to provide a certain sealing performance against an internal pressure with the threaded connection of U.S. Pat. No. 4,494,777.

In the threaded connection of Japanese Patent No. 3426600, a seal portion is provided in the middle of each of the pin and box. This arrangement provides a certain wall thickness to the seal portion of each of the pin and box, increasing sealing performance compared with the threaded connections of JP Hei2(1990)-31271 A and U.S. Pat. No. 4,494,777. However, if a thread is divided into two stages by a seal portion, the wall thickness that can be used for each stage becomes smaller. This results in a thread with small perfect thread portions and low thread heights, which significantly decreases the strength, especially tensile strength, of the thread joint. That is, if a high internal or external pressure penetrates the interior of the connection, low threads or imperfect threads can easily be radially disengaged; thus, even a low tensile load may cause the internal thread to jump out. Thus, the threaded connection of Japanese Patent No. 3426600 does not provide a sufficient joint strength and sealing performance.

Each of the threaded connections of U.S. Patent Application Publication No. 2012/0043756 and U.S. Pat. No. 5,687,999 has both an inner seal portion and an outer seal portion. In these arrangements, the internal seal portion works against an internal pressure and the outer seal portion works against an external pressure. However, in the threaded connections of U.S. Patent Application Publication No. 2012/0043756 and U.S. Pat. No. 5,687,999, similar to the threaded connection of Japanese Patent No. 3426600, a thread is divided into two stages, making the strength of the thread joint insufficient. Thus, the threaded connections of U.S. Patent Application Publication No. 2012/0043756 and U.S. Pat. No. 5,687,999 cannot be expected to provide a sufficient joint strength and sealing performance.

Thus, the threaded connections disclosed in the above-discussed patent documents cannot provide a sufficient joint strength and sealing performance against both an internal pressure and an external pressure.

An object of the present disclosure is to provide a threaded connection for steel pipe with improved sealing performance against both an internal pressure and an external pressure without a reduction in joint strength, particularly tensile strength.

A threaded connection for steel pipe according to the present disclosure includes a tubular pin and a tubular box. In the threaded connection for steel pipe, the pin and box are assembled as the pin is screwed into the box. The outer diameter of the box is smaller than 108% of the outer diameter of the body of the steel pipe. The pin includes, beginning with its tip toward the body of the steel pipe, a pin lip, a male thread, and a second seal surface. The pin lip includes a first seal surface. The male thread is constituted by a single-stage tapered thread. The box includes a first seal surface, a female thread, and a box lip. The first seal surface corresponds to the first seal surface of the pin. The female thread corresponds to the male thread and is constituted by a single-stage tapered thread. The box lip includes a second seal surface corresponding to the second seal surface of the pin. When assembled, the first seal surfaces are in contact with each other and the second seal surfaces are in contact with each other. A portion of the male thread located near an end thereof close to the pin lip includes a plurality of thread root surfaces extending parallel to a pipe axis and having the same diameter. A portion of the female thread located near an end thereof close to the box lip includes a plurality of thread root surfaces extending parallel to the pipe axis and having the same diameter.

The threaded connection for steel pipe according to the present disclosure has improved sealing performance against both an internal pressure and an external pressure without a reduction in joint strength, particularly tensile strength.

DETAILED DESCRIPTION OF THE PREFERRED EMBODIMENTS

Figure 1:
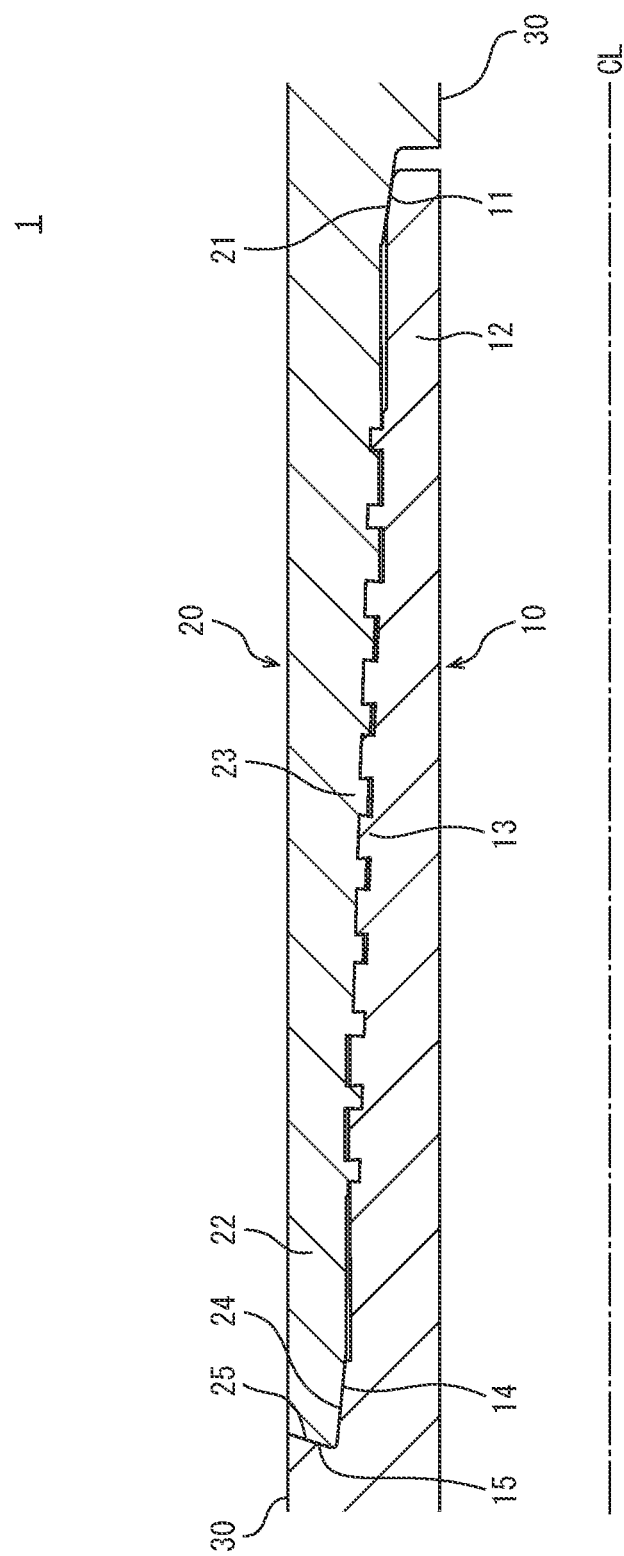
FIG. 1 is a vertical cross-sectional view of a threaded connection for steel pipe according to an embodiment.

As discussed above, in a slim-type threaded connection, the inner and outer diameters are strictly limited. Accordingly, required components such as threads and seal portions must be disposed within tightly limited wall thicknesses, and good sealing performance must be achieved while providing a certain joint strength. However, in slim-type threaded connection, it is usually difficult to ensure that the portions including seal portions have sufficient wall thicknesses.

For example, a threaded connection having only an inner seal portion exhibits a sealing performance against an internal pressure partly because the internal pressure presses the tip of the pin onto the box. However, an external pressure may penetrate through clearances between the threads to reach the tip of the pin and pushes down the tip of the pin, which has a thin wall thickness; thus, when an external pressure is applied, radial clearances can be easily created between the pin and box. Thus, an arrangement having only an inner seal portion cannot exhibit a sufficient sealing performance against the external pressure.

On the other hand, a threaded connection having only an outer seal portion exhibits a sealing performance against an external pressure partly because the external pressure presses the tip of the box onto the pin. However, an internal pressure may penetrate through clearances between the threads to reach the end portion of the box and pushes up the tip of the box, which has a thin wall thickness; thus, when an internal pressure is applied, radial clearances can be easily created between the pin and box. Thus, an arrangement having only an outer seal portion cannot exhibit a sufficient sealing performance against the internal pressure.

In some arrangements, a seal portion may be provided in the middle of the threaded connection. In such arrangements, the wall thicknesses of the seal portion in a slim-type threaded connection can be maximized. In addition, such arrangements have thread engagements on both sides of the seal portion, providing high sealing performance.

However, if a seal portion is provided in the middle of the threaded connection, the thread assembly is necessarily composed of two-stage threads, that is, one thread is divided into two stages and, consequently, the wall thicknesses that can be used for each thread stage are very small. As a result, the thread includes almost no perfect thread portions and includes large imperfect thread portions, significantly reducing the strength of the thread joint, particularly tensile strength.

In other arrangements, both an inner seal portion and an outer seal portion may be provided. In such arrangements, the inner seal portion works against an internal pressure and the outer seal portion works against an external pressure. This provides a better sealing performance against both internal and external pressures than an arrangement with only an inner seal portion or only an outer seal portion. Further, such arrangements allow the thread assembly to be composed of single-stage threads, which does not significantly decrease the strength of the thread joint.

The inventors of the threaded connection for steel pipe according to the embodiments have done research for further improving the sealing performance of a threaded connection where both a portion of the pin close to the tip and a portion close to the steel-pipe body have seal portions and the thread assembly is constituted by single-stage threads. After extensive research, the inventors found that sealing performance can be significantly improved by maximizing the wall thickness of the tip portion of the pin which has an inner seal portion (hereinafter also referred to as "pin lip") and the end portion of the box which has an outer seal portion (hereinafter also referred to as "box lip").

As discussed above, in a slim-type threaded connection, the inner and outer diameters are strictly limited. This makes it impossible to reduce the inner diameter of the pin lip in order to increase its wall thickness, or increase the outer diameter of the box lip in order to increase its wall thickness. For example, the length of a thread may be reduced or the height of the ridge may be reduced, or the taper angle of the thread may be reduced to save the wall thickness used for the thread, thereby increasing the wall thicknesses of the pin lip and box lip. However, in such arrangements, the strength and handleability of the threaded connection may significantly decrease: for example, the strength of the thread joint may be insufficient such that a thread ridge may be broken or the pin may accidentally slip out (or jump out) of the box, or, when the pin and box are to be assembled, the pin or box may have to be rotated a very large number of times, or cross-threads may easily occur.

In view of this, the present inventors focused on how the end portions of the thread assembly of conventional threaded connections engage with each other. A thread is constituted by a tapered thread provided on the outer or inner periphery of a pipe and, as such, thread crests of the male or female thread located near an end of the thread are truncated such that the height of the thread ridges gradually decreases. On the other hand, the depth of the thread grooves corresponding to these ridges does not decrease, resulting in large spaces between the thread crests and roots near the ends of the thread assembly even after the threads are assembled.

This means a huge waste of space in a slim-type threaded connection, which has strictly limited dimensions. It occurred to the present inventors that the sealing performance may be further improved by effectively utilizing the regions with such spaces in a threaded connection. The inventors reached the idea that the depth of the thread grooves near the ends of each thread may gradually decrease as the height of the thread ridges gradually decreases to increase the wall thicknesses of the pin lip and box lip.

The threaded connection for steel pipe according to the embodiments was made based on the above-described findings. A threaded connection for steel pipe according to an embodiment includes a tubular pin and a tubular box. In the threaded connection for steel pipe, the pin and box are assembled as the pin is screwed into the box. The outer diameter of the box is smaller than 108% of the outer diameter of the body of the steel pipe. The pin includes, beginning with its tip toward the body of the steel pipe, a pin lip, a male thread, and a second seal surface. The pin lip includes a first seal surface. The male thread is constituted by a single-stage tapered thread. The box includes a first seal surface, a female thread, and a box lip. The first seal surface corresponds to the first seal surface of the pin. The female thread corresponds to the male thread and is constituted by a single-stage tapered thread. The box lip includes a second seal surface corresponding to the second seal surface of the pin. When assembled, the first seal surfaces are in contact with each other and the second seal surfaces are in contact with each other. A portion of the male thread located near an end close to the pin lip includes a plurality of thread root surfaces extending parallel to a pipe axis and having the same diameter. A portion of the female thread located near an end close to the box lip includes a plurality of thread root surfaces extending parallel to the pipe axis and having the same diameter. As used herein, "same diameter" means the "same" diameter that can be achieved when the connection is treated using machining equipment or a machining tool such as an NC lathe typically used by a person skilled in the art with a normal precision, and means that there are only differences in average diameter of at most several hundreds of micrometers. The male and female threads "including a plurality of thread root surfaces extending parallel to the pipe axis and having the same diameter" means that, in a vertical cross-sectional view of the threaded connection, each thread includes a plurality of thread root surfaces that extend parallel to the pipe axis and have the same diameter.

In the above-described threaded connection, the male thread includes, near its end close to the pin lip, a plurality of thread root surfaces extending parallel to the pipe axis and having the same diameter. This arrangement will increase the wall thickness of the pin lip compared with an arrangement where all the thread root surfaces of the male thread are arranged along a taper face that reduces in diameter toward the pin lip. This will significantly increase the elastic recovery force due to the amount of interference of the first seal surface of the pin, thereby improving sealing performance against the internal pressure.

In the above-described threaded connection, the female thread includes, near its end close to the box lip, a plurality of thread root surfaces extending parallel to the pipe axis and having the same diameter. This arrangement increases the wall thickness of the box lip compared with an arrangement where all the thread root surfaces of the female thread are provided along a taper face that increases in diameter toward the box lip. This significantly increases the elastic recovery force due to the amount of interference of the second seal surface of the box, thereby improving sealing performance against the external pressure.

In the above-described threaded connection, the male and female threads are constituted by single-stage tapered threads. This increase the wall thicknesses that can be used for threads compared with threaded connections with two-stage threads, ensuring sufficient perfect thread portions. This will minimize the decrease in the tensile strength of the thread joint, thereby ensuring a sufficient joint strength.

In the above-described threaded connection, the pin may further include a shoulder surface provided on at least one of the end surfaces close to the tip and steel-pipe body. The box may further include a shoulder surface corresponding to the shoulder surface of the pin. When assembled, the corresponding shoulder surfaces may be in contact with each other.

In this arrangement, how far the pin can be screwed into the box may be limited. Further, as the corresponding shoulder surfaces are in contact with each other when assembled, thread-tightening axial forces are generated inside the connection, further strengthening the connection of the threads.

In the above-described threaded connection, the pin may further include a first nose provided between the tip surface and the first seal surface of the pin.

In this arrangement, the stiffness of the pin lip (i.e. elastic recovery force of the first seal surface of the pin) may be further improved. This will further improve sealing performance against the internal pressure.

In the above-described threaded connection, the box may further include a second nose provided between the end surface corresponding to the end surface of the pin close to the steel-pipe body and the second seal surface of the box.

This arrangement will further improve the stiffness of the box lip (i.e. elastic recovery force of the second seal surface of the box). This will further improve sealing performance against the external pressure.

In the above-described threaded connection, the thread assembly composed of the male and female threads may have a vertical cross-sectional thread shape (hereinafter simply referred to as thread shape) that is dove-tailed where the thread width gradually changes along the lead of the thread.

In the above-described threaded connection, the thread assembly composed of the male and female threads may be single-start or double-start.

In the above-described threaded connection, the distance between the male thread and the first seal surface of the pin as measured in the pipe-axis direction may be 1.5 times the thread pitch of the male thread or greater.

In the above-described threaded connection, the distance between the female thread and the second seal surface of the box as measured in the pipe-axis direction may be 1.5 times the thread pitch of the female thread or greater.

Embodiments

Embodiments of the threaded connection for steel pipe will now be described with reference to the drawings. The same or corresponding components in the drawings are labeled with the same characters and their description will not be repeated.

FIG. 1 is a vertical cross-sectional view of a threaded connection 1 for steel pipe according to an embodiment. The threaded connection 1 is an integral-type threaded connection and is composed of a pin 10 and a box 20. Alternatively, the construction of the threaded connection 1 may be applied to a coupling-type threaded connection.

The threaded connection 1 is a slim-type one where the difference between the outer diameter of the box 20 and the outer diameter of the steel-pipe body 30 is small. Thus, the outer diameter of the box 20 is smaller than 108% of the outer diameter of the steel-pipe body 30. The outer diameter of the box 20 is 100% of the outer diameter of the steel-pipe body 30 or larger. The steel-pipe body 30 means portions of the steel pipes connected by the threaded connection 1 that are other than the pin 10 and box 20.

The pin 10 includes, beginning with its tip toward the body 30 of the steel pipe, a pin lip 12 including a first seal surface 11, a male thread 13, and a second seal surface 14. The pin 10 further includes a shoulder surface 15 on its end close to the steel-pipe body 30. The inner diameter of the pin 10 is larger than the drift diameter specified by the American Petroleum Institute (API) standards. For ease of explanation, the direction toward the tip of the pin 10 may be hereinafter referred to as inward with respect to the pipe-axis direction, and the direction toward the end of the pin 10 close to the steel-pipe body 30 as outward with respect to the pipe-axis direction.

The first seal surface 11 is provided on the outer periphery of the pin lip 12 extending from the male thread 13 toward the tip. The second seal surface 14 is provided on the outer periphery of the pin 10 and located closer to the steel-pipe body 30 than the male thread 13 is. Thus, on the outer periphery of the pin 10, the male thread 13 is located between the first and second seal surfaces 11 and 14.

The first and second seal surfaces 11 and 14 are tapered. More exactly, each of the first and second seal surfaces 11 and 14 has the shape of a face corresponding to the periphery of a truncated cone decreasing in diameter toward the tip of the pin 10, or the shape of a face corresponding to the periphery of such a truncated cone and the periphery of a solid of revolution obtained by rotating a curve such as an arc about the pipe axis CL, or the shape obtained by combining them.

The shoulder surface 15 is an annular surface almost perpendicular to the pipe axis CL. In FIG. 1, the shoulder surface 15 slightly inclines toward the direction of advancement of screw-in of the pin 10 relative to a plane perpendicular to the pipe axis CL, i.e. slightly inclines toward the tip of the pin 10 at its outer periphery.

The box 20 includes, arranged outwardly with respect to the pipe-axis direction, a first seal surface 21, a female thread 23, and a box lip 22 including a second seal surface 24. The box 20 further includes a shoulder surface 25 on its outward end. The first seal surface 21, female thread 23, second seal surface 24 and shoulder surface 25 of the box 20 correspond to the first seal surface 11, male thread 13, second seal surface 14 and shoulder surface 15 of the pin 10.

The male thread 13 of the pin 10 and the female thread 23 of the box 20 are constituted by single-stage tapered threads capable of engaging each other. The thread shape of the male and female threads 13 and 23 is dove-tailed.

The thread width of the male and female threads 13 and 23 changes along the direction of advancement of screw-in of the pin 10. More specifically, the width of the ridges of the male thread 13 decreases as it goes in the direction of advancement of the right-hand screw along the helix of the thread (lead), and the thread groove width of the opposite female thread 23 also decreases as it goes in the direction of advancement of the right-hand screw along the helix of the thread.

The male and female threads 13 and 23 allow each other to be screwed in. The first seal surfaces 11 and 21 and the second seal surfaces 14 and 24 contact each other as the pin 10 is screwed in, and, when assembled, they fit together in close contact and are in a state of interference fit. Thus, the first seal surfaces 11 and 21 form a first seal portion (inner seal portion) in metal-to-metal contact. The second seal surfaces 14 and 24 form a second seal portion (outer seal portion) in metal-to-metal contact.

As the pin 10 is screwed into the box 20, the shoulder surfaces 15 and 25 contact each other and are pressed against each other, thereby serving as a stop that limits screw-in of the pin 10. Further, when assembled, the shoulder surfaces 15 and 25 serve to provide the male thread 13 of the pin 10 with a load in the direction (rearward) opposite to the direction (forward) of advancement of screw-in, i.e. so-called thread-tightening axial forces. The shoulder surfaces 15 and 25 form a shoulder portion by this mutual press-contact.

Figure 2:
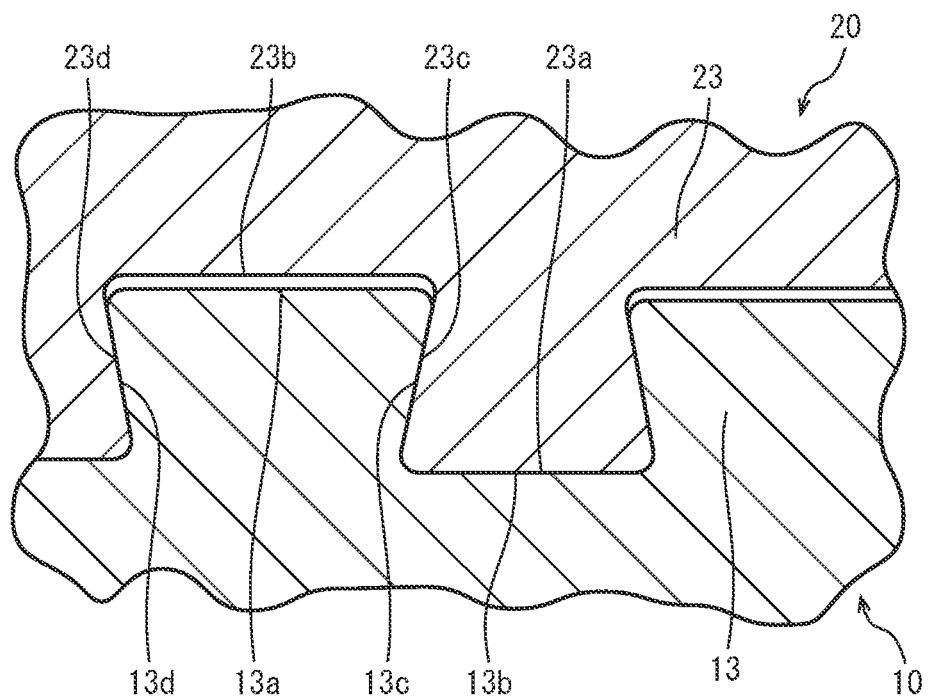
FIG. 2 is an enlarged vertical cross-sectional view of the threads of the threaded connection for steel pipe shown in FIG. 1.

FIG. 2 is an enlarged vertical cross-sectional view of the threads of the threaded connection 1. The thread assembly includes the male thread 13 of the pin 10 and the female thread 23 of the box 20. Although not limiting, the threads are preferably single-start or double-start threads.

As shown in FIG. 2, the male thread 13 of the pin 10 includes a plurality of thread crest surfaces 13a, thread root surfaces 13b, stabbing flank surfaces 13c going first during screw-in (hereinafter also referred to as "stabbing surfaces") and load flank surfaces 13d opposite to the stabbing surfaces 13c (hereinafter also referred to as "load surfaces"). The female thread 23 of the box 20 includes a plurality of thread crest surfaces 23a, thread root surfaces 23b, stabbing surfaces 23c and load surfaces 23d. Each thread crest surface 23a of the female thread 23 faces the corresponding thread root surface 13b of the male thread 13. Each thread root surface 23b of the female thread 23 faces the corresponding thread crest surface 13a of the male thread 13. Each stabbing surface 23c of the female thread 23 faces the corresponding stabbing surface 13c of the male thread 13. Each load surface 23d of the female thread 23 faces the corresponding load surface 13d of the male thread 13.

The flank angles of the load surfaces 13d and 23d and stabbing surfaces 13c and 23c of the male thread 13 and female thread 23 are negative angles less than 0°. As used herein, flank angle is the angle formed by a plane perpendicular to the pipe axis CL and a flank surface. For the threaded connection shown in FIG. 2, the flank angles of the load surfaces 13d and 23d are positive if clockwise, while the flank angles of the stabbing surfaces 13c and 23c are positive if counterclockwise.

When assembled, the load surfaces 13d and 23d of the male and female threads 13 and 23 contact each other and the stabbing surfaces 13c and 23c contact each other, while the thread root surface 13b of the male thread 13 and the thread crest surface 23a of the female thread 23 contact each other. A clearance is formed between the thread crest surface 13a of the male thread 13 and the thread root surface 23b of the female thread 23. Alternatively, contrary to this arrangement, the thread crest surface 13a of the male thread 13 and the thread root surface 23b of the female thread 23 may contact each other while a clearance may be formed between the thread root surface 13b of the male thread 13 and the thread crest surface 23a of the female thread 23. Still alternatively, a clearance may be formed between the stabbing surfaces 13c and 23c of the male thread 13 and female thread 23.

Figure 3:
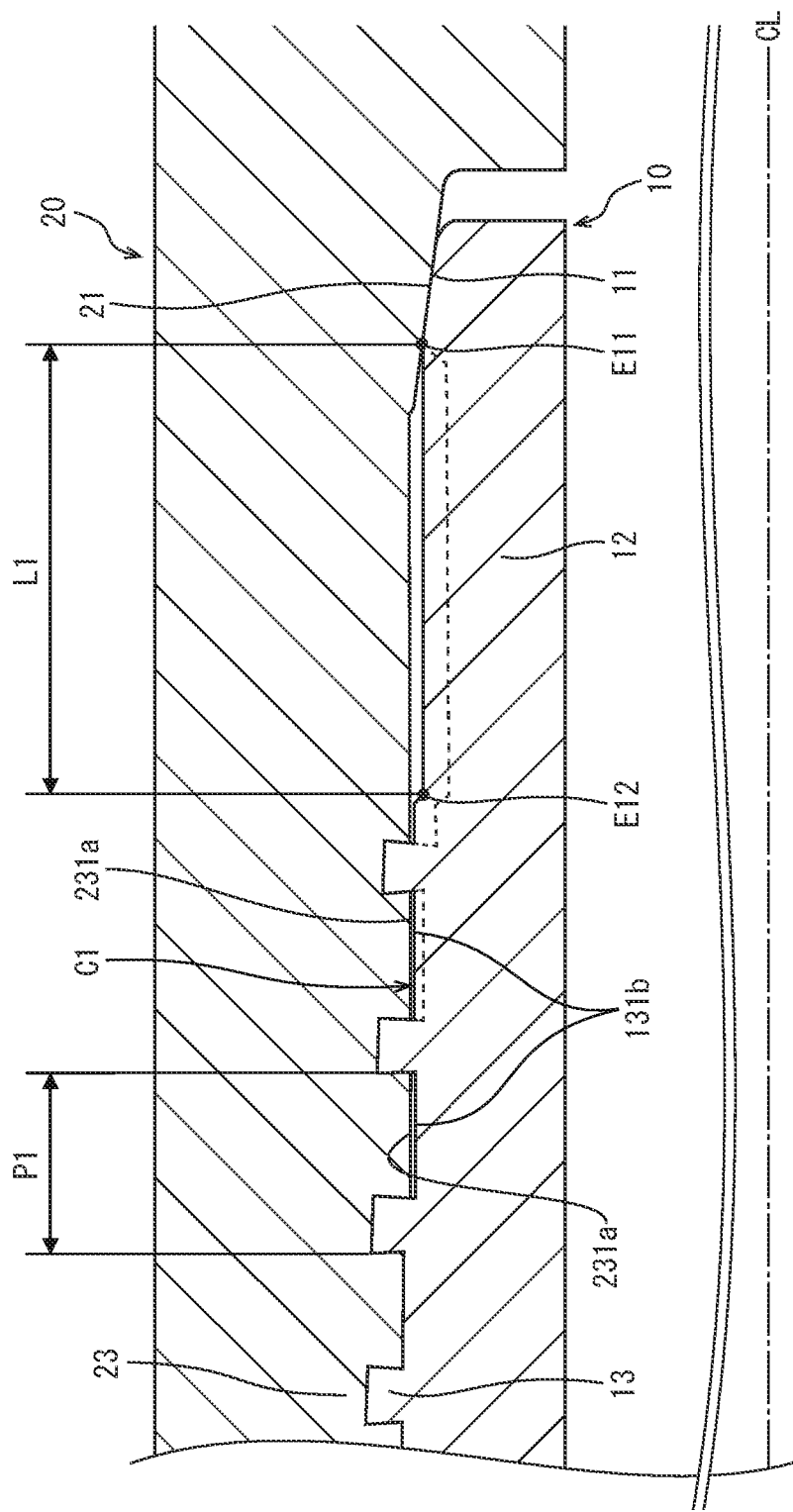
FIG. 3 is an enlarged vertical cross-sectional view of the inward end portion, as determined along the pipe-axis direction, of the threaded connection for steel pipe shown in FIG. 1.

FIG. 3 is an enlarged vertical cross-sectional view of the end of the threaded connection 1 close to the pin lip 12 (the inward end with respect to the pipe-axis direction). As shown in FIG. 3, the male thread 13 includes, near its end close to the pin lip 12, a plurality of thread root surfaces 131b extending parallel to the pipe axis CL and having the same diameter. The two or more of the thread root surfaces 131b of the male thread 13 that are located most inward with respect to the pipe-axis direction substantially have the shape of the side of a cylinder. That is, the thread root surfaces 131b are made of the side of a cylinder having an axial center consistent with the pipe axis CL.

The depth of the thread grooves near the inward portion of the male thread 13 gradually decreases toward the pin lip 12 in the pipe-axis direction. Those ones of the thread root surfaces of the male thread 13 that are other than the thread root surfaces 131b are shaped along the periphery of a truncated cone decreasing in diameter toward the pin lip 12.

The thread crest surfaces 231a of the female thread 23 that correspond to the thread root surfaces 131b of the male thread 13 extend parallel to the pipe axis CL and have the same diameter. That is, in the female thread 23, the two or more thread crest surfaces 231a located most inward with respect to the pipe-axis direction extend parallel to the pipe axis CL and have the same diameter. Each thread crest surface 231a is coaxial with the corresponding thread root surface 131b of the male thread 13, and has the shape of the side of a cylinder with a slightly larger diameter than this thread root surface 131b. Thus, when assembled, a clearance C1 is formed between each thread crest surface 231a and the corresponding thread root surface 131b of the male thread 13. Those ones of the thread crest surfaces of the male thread 23 that are other than the thread crests 231a are shaped along the periphery of a truncated cone decreasing in diameter as it goes inward with respect to the pipe-axis direction.

The clearance C1 is created by the difference between the diameter of the side of the cylinder representing the thread crest surfaces 231a of the female thread 23 and the diameter of the side of the cylinder representing the thread root surfaces 131b of the male thread 13. Although not limiting, for example, when the threaded connection is assembled, the average of C1 is larger than 0 μm and not larger than 900 μm, and more preferably not larger than 500 μm. Average is used herein because an actual product has elliptical errors and C1 is rarely uniform over the entire periphery. Thus, in some cases, C1 may be zero in some portions of the circumference, and portions may exist where the maximum clearance is over 900 μm.

As discussed above, the first seal surface 11 of the pin lip 12 is in contact with the first seal surface 21 of the box 20 when assembled. Those portions of the outer periphery of the pin lip 12 that are other than the first seal surface 11 are not in contact with the box 20 when assembled.

The distance between the male thread 13 and first seal portion as measured in the pipe-axis direction, L1, is preferably 1.5 times the thread pitch P1 or greater, for example. The distance L1 is the length beginning at the outward end E11 of the first seal surface 11 in contact with the first seal surface 21 of the box 20 and ending with the inward end E12 of the male thread 13 as measured in the pipe-axis direction. Thread pitch P1 means the length between the load surfaces of adjacent thread ridges of the male thread 13 as measured in the pipe-axis direction (in the specification, this definition also applies to the thread pitch for a double-start thread).

Figure 4:
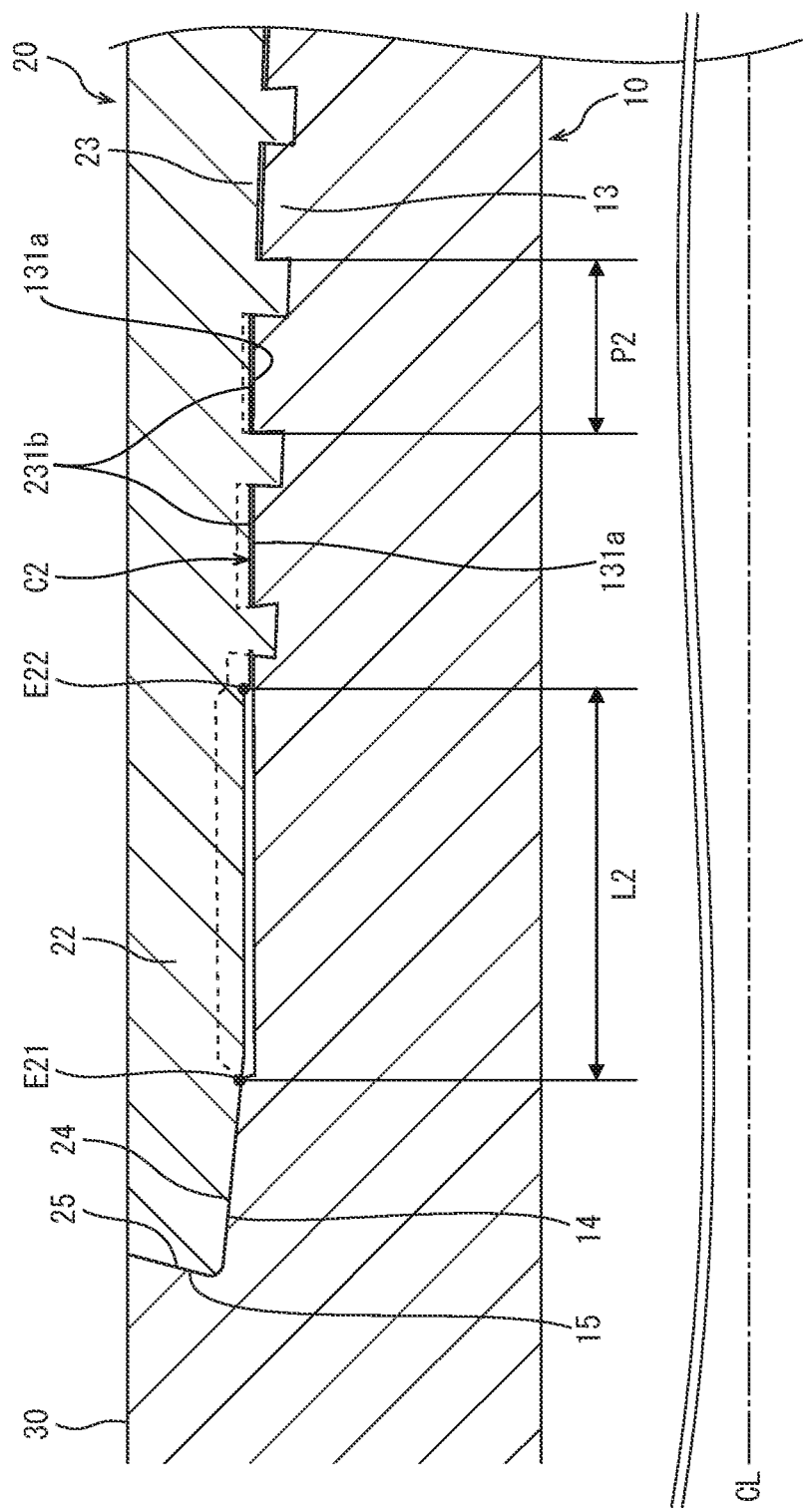
FIG. 4 is an enlarged vertical cross-sectional view of the outward end portion, as determined along the pipe-axis direction, of the threaded connection for steel pipe shown in FIG. 1.

FIG. 4 is an enlarged vertical cross section of the end of the threaded connection 1 close to the box lip 22 (i.e. outward end in the pipe-axis direction). As shown in FIG. 4, the female thread 23 includes, near its end close to the box lip end 22, a plurality of thread root surfaces 231b extending parallel to the pipe axis CL and having the same diameter. The two or more thread rood surfaces 231b of the female thread 23 that are located most outward in the pipe-axis direction substantially have the shape of the side of a cylinder. That is, the thread root surfaces 231b are constituted by the side of the cylinder having an axis consistent with the pipe axis CL. The depth of the thread grooves near the outward end of the female thread 23 gradually decreases toward the box lip 22 along the pipe-axis direction. Those ones of the thread root surfaces of the female thread 23 that are other than the thread root surfaces 231b are shaped along the periphery of a truncated cone decreasing in diameter as it goes away from the box lip 22.

The thread crest surfaces 131a of the male thread 13 that correspond to the thread root surfaces 231b of the female thread 23 extend parallel to the pipe axis CL and have the same diameter. That is, the two or more thread crest surfaces 131a of the male thread 13 that are located most outward as determined along the pipe-axis direction extend parallel to the pipe axis CL and have the same diameter. The thread crest surfaces 131a are each coaxial with the corresponding thread root surface 231b of the female thread 23 and have the shape of the side of a cylinder having a slightly smaller diameter than the thread root surfaces 231b. Thus, when assembled, a clearance C2 is formed between each thread crest surface 131a and the corresponding thread root surface 231b of the female thread 23. Those ones of the thread crest surfaces of the male thread 13 that are other than the thread crest surfaces 131a are shaped along the periphery of a truncated cone decreasing in diameter as it goes inward as determined along the pipe-axis direction.

The clearance C2 is created by the difference between the diameter of the side of the cylinder representing the thread crest surfaces 131a of the male thread 13 and the diameter of the side of the cylinder representing the thread root surfaces 231b of the female thread 23. Although not limiting, for example, when the threaded connection is assembled, the average of C2 is larger than 0 μm and not larger than 900 μm and more preferably not larger than 500 μm. Average is used herein for the same reasons for C1.

As discussed above, the second seal surface 24 of the box lip 22 is in contact with the second seal surface 14 of the pin 10 when assembled. Those portions of the inner periphery of the box lip 22 that are other than the second seal surface 24 and shoulder surface 25 do not contact the pin 10 when assembled.

The distance between the female thread 23 and second seal portion as measured in the pipe-axis direction, L2, is preferably 1.5 times the thread pitch P2 or greater, for example. Distance L2 means the length beginning with the inward end E21 of the second seal surface 24 in contact with the second seal portion 14 of the pin 10 and ending with the outward end E22 of the female thread 23 as measured in the pipe-axis direction. Thread pitch P2 means the distance between the load surfaces of adjacent thread ridges of the female thread 23 as measured in the pipe-axis direction.

As discussed above, in the threaded connection 1 for steel pipe according to the present embodiment, the male thread 13 includes, near its end close to the pin lip 12, a plurality of thread root surfaces 131b extending parallel to the pipe axis CL and having the same diameter. This increases the wall thickness of the pin lip 12 compared with implementations where all the thread root surfaces of the male thread 13 are arranged along the taper face decreasing in diameter as it goes toward the pin lip 12.

If all the thread root surfaces of the male thread 13 are arranged along a taper face, a space must be provided in the outer periphery of the pin lip 12, as indicated by broken lines in FIG. 3, to allow a tool that moves while inclined relative to the pipe axis CL to escape after the male thread 13 is formed. In contrast, if the thread root surfaces 131b near the end of the male thread 13 close to the pin lip 12 extend parallel to the pipe axis CL and have the same diameter, as in the present embodiment, the tool near the end of the thread close to the pin lip 12 moves parallel to the pipe axis CL; as such, no space needs to be provided in the pin lip 12 for allowing the tool to escape. Thus, the present embodiment prevents the wall thickness of the pin lip 12 including the first seal surface 11 from being reduced, thereby increasing the stiffness of the pin lip 12. This will improve sealing performance against the internal pressure.

In the threaded connection 1 for steel pipe according to the present embodiment, the female thread 23 includes, near its end close to the box lip 22, a plurality of thread root surfaces 231*b* extending parallel to the pipe axis CL and having the same diameter. This increases the wall thickness of the box lip 22 compared with implementations where all the thread root surfaces of the female thread 23 are arranged along a taper face increasing in diameter toward the box lip 22.

If all the thread root surfaces of the female thread 23 are arranged along the taper face, a space must be provided in the inner periphery of the box lip 22, as indicated by broken lines in FIG. 4, to allow a tool that moves while inclined relative to the pipe axis CL to escape after the female thread 23 is formed. In contrast, if the thread root surfaces 231*b* near the end of the female thread 23 close to the box lip 22 extend parallel to the pipe axis CL and have the same diameter, as in the present embodiment, the tool near the end of the thread close to the box lip 22 moves parallel to the pipe axis CL; as such, no space needs to be provided on the inner periphery of the box lip 22 for allowing the tool to escape. Thus, the present embodiment prevents the wall thickness of the box lip 22 including the second seal surface 24 from being reduced, thereby increasing the stiffness of the box lip 22. This will improve sealing performance against the external pressure.

In the threaded connection 1 for steel pipe according to the present embodiment, each of the male and female threads 13 and 23 is constituted by a single-stage tapered thread. Thus, as compared with a threaded connection with a thread assembly constituted by double-stage threads, the threaded connection 1 has larger wall thicknesses that can be used for the thread assembly, thereby ensuring sufficient perfect thread portions. This will minimize the decrease in the tensile strength of the thread joint, ensuring a sufficient joint strength.

Thus, the present embodiment ensures sufficient wall thicknesses of the pin lip 12 on which the inner seal is provided and the box lip 22 on which the outer seal is provided, thereby improving sealing performance against both the internal and external pressures. Further, joint strength, particularly tensile strength is not decreased in order to improve sealing performance.

In addition, in the present embodiment, the thread root surfaces 131*b* of the male thread 13 provided near the end thereof close to the pin lip 12 have the shape of the side of a cylinder with a slightly smaller diameter than the corresponding thread crest surfaces 231*a* of the female thread 23. Thus, near the inward end of the thread assembly, the clearance C1 between a thread root surface 131*b* of the male thread 13 and the corresponding thread crest surface 231*a* of the female thread 23 is relatively small. Further, the thread root surfaces 231*b* of the female thread 23 provided near the end thereof close to the box lip 22 have the shape of the side of a cylinder with a slightly larger diameter than the corresponding thread crest surfaces 131*a* of the male thread 13. Thus, near the outward end of the thread assembly, the clearance C2 between a thread root surface 231*b* of the female thread 23 and the corresponding thread crest surface 131*a* of the male thread 13 is relatively small. That is, according to the present embodiment, the clearances between thread crest surfaces and the corresponding thread root surfaces near the inner and outward ends of the thread assembly constituted by tapered threads are smaller than those of conventional arrangements. According to the present inventors, adopting this arrangement will increase the wall thicknesses that can be used for the pin lip 12 and box lip 22. This will further improve sealing performance against the internal and external pressures.

In the present embodiment, a shoulder surface 15 is provided on the end of the pin 10 close to the steel-pipe body 30. The box 20 includes a shoulder surface 25 corresponding to the shoulder surface 15 of the pin 10. Since the shoulder surfaces 15 and 25 are in contact with each other when assembled, they can serve as a stop for limiting screw-in of the pin 10 into the box 20. Further, the shoulder surfaces 15 and 25 are capable of generating a thread-tightening axial force inside the connection.

According to the present embodiment, the thread assembly composed of the male and female threads 13 and 23 has dove-tailed shape and has varying thread widths. In this arrangement, when assembled, the load surfaces are in contact with each other and the thread crest surfaces and the thread root surfaces are in close contact, achieving good sealing performance. If the stabbing surfaces are also in contact with each other when assembling of the pin 10 and box 20 is completed, the entire threads firmly fit together, further improving sealing performance.

Each of the first and second seal portions has such a fit margin (or amount of interference) that the first seal surfaces 11 and 21 and the second seal surfaces 14 and 24 are in close contact with a sufficient contact force along the entire circumference when assembled to exhibit a sufficient sealing performance. Accordingly, if the distance between the first and/or second seal portions and the thread portion as measured in the pipe-axis direction is too small, the amount of interference of the first and/or second seal portions may move the female thread 23 out of engagement with the male thread 13, resulting in a decrease in the strength of the thread joint near the ends of the threads.

The present embodiment provides a distance L1 between the thread portion and first seal portion as measured in the pipe-axis direction to prevent the contact between the first seal surfaces 11 and 21 and the contact between the male and female threads 13 and 23 from adversely affecting each other. Further, the present invention provides a distance L2 between the thread portion and second seal portion as measured in the pipe-axis direction to prevent the contact between the second seal surfaces 14 and 24 and the contact between the male and female threads 13 and 23 from adversely affecting each other. For example, the distances L1 and L2 are 1.5 times the thread pitches P1 and P2, respectively, or larger. This will prevent the strength of the thread joint from being decreased by the amounts of interference of the first and/or second seal portions.

Preferred modes of the main components will be provided below.

(Threads)

As discussed above, near the inward end of the thread assembly as determined along the pipe-axis direction, a clearance C1 is present between a thread root surface 131*b* of the male thread 13 and the corresponding thread crest surface 231*a* of the female thread 23. Near the outward end of the thread assembly as determined along the pipe-axis direction, a clearance C2 is created between a thread crest surface 131*a* of the male thread 13 and the corresponding thread root surface 231*b* of the female thread 23. The clearances C1 and C2 are preferably established according to the unevenness (or manufacturing tolerance) in the circularity (or ovality) of the inward and outward ends of the threaded portion as determined along the pipe-axis direction. The circularity greatly varies depending on, for example, the outer diameter of the steel pipe, wall thickness size, material, manufacturing method and other factors. However, the circularity is generally not lower than 5% and not higher than 50% of the height (or radial dimensions) of the load surface of the lower one of a perfect ridge of the male thread 13 and a perfect ridge of the female thread 23, and more preferably not lower than 10% and not higher than 30%.

The thread ridge height and thread taper of the thread portion are not limited to any particular values. The thread ridge height and thread taper can be adjusted according to the outer diameter and wall thickness size of the steel pipe, for example. If the connection is used for steel pipes for oil wells, the thread ridge height may be generally in the range of 0.8 mm to 3 mm. If the connection is used for steel pipes for oil wells, the thread taper may be generally in the range of ½₁ to ¼.

If the thread portion is constituted by dove-tailed threads, although not limiting, each of the flank angles of the load surface and stabbing surface may be, for practical reasons, not lower than −31° and lower than 0°. From the viewpoint of manufacturability, each of the flank angles of the load surface and stabbing surface may be, more preferably, in the range of −16° to −2°. The flank angle of the load surface and the flank angle of the stabbing surface do not have be to equal.

(Inner and Outer Diameters of Threaded Connection for Steel Pipe)

The present embodiment is particularly used for flush-type, semi-flush-type and slim-type threaded connections for steel pipe, in which the difference between the outer diameter of the box 20 and the outer diameter of the steel-pipe body 30 is small. As discussed above, in the threaded connection 1 for steel pipe according to the present embodiment, the outer diameter of the box 20 is not larger than 108% of the outer diameter of the steel-pipe body 30. Particularly, in flush-type and semi-flush-type threaded connections with smaller differences between the outer diameters of the box 20 and steel-pipe body 30, the outer diameter of the box 20 is not larger than 104% of the outer diameter of the steel-pipe body 30. The lower limit for the inner diameter of the threaded connection 1 (i.e. inner diameter of the pin 10) may be, for example, the drift diameter of SPEC 5CT in accordance with the API standards.

(Seal Portions)

The shapes and dimensions of the first seal surfaces 11 and 21 and the second seal surfaces 14 and 24 are not limited to any particular values. In a vertical cross section of the threaded connection 1 (i.e. cross section obtained by cutting the connection along a plane containing the pipe axis CL), the profile of each of the first seal surfaces 11 and 21 and second seal surfaces 14 and 24 may be constructed by a straight line, an arc, a partial ellipse or a smooth convex line, or a combination thereof.

(Distance Between Thread Portion and Seal Portion)

As discussed above, if the distance between the first and/or second seal portions and the thread portion as measured in the pipe-axis direction is too close, the amount of interference of the first and/or second seal portions may move the female thread 23 out of engagement with the male thread 13, which may decrease the strength of the thread joint near the ends of the thread portion. In view of this, the distance between the thread portion and first seal portion as measured in the pipe-axis direction, L1, and the distance between the thread portion and second seal portion as measured in the pipe-axis direction, L2, are preferably 1.5 times of the thread pitches P1 and P2, respectively, or larger, although they may vary depending on the outer diameter or wall thickness size of the threaded connection 1, for example. From the viewpoints of manufacturing costs and handleability, the distances L1 and L2 may be not larger than 5 times the thread pitches P1 and P2, respectively.

(Circumferential Tensile Yield Strength of Ends of Box)

The circumferential tensile yield strength of the ends of the box 20 may be increased by cold expansion forming, for example. For example, the circumferential tensile yield strength at the second seal surface 24 of the box 20 is preferably increased by at least 5% relative to the tensile yield strength of the steel-pipe body 30, and more preferably increased by 10% or higher.

[Variations]

Although an embodiment has been described, the present disclosure is not limited to the above-described embodiment, and various modifications are possible without departing from the spirit thereof. For example, as shown in FIGS. 5 and 6, the pin or box may include a nose.

Figure 5:
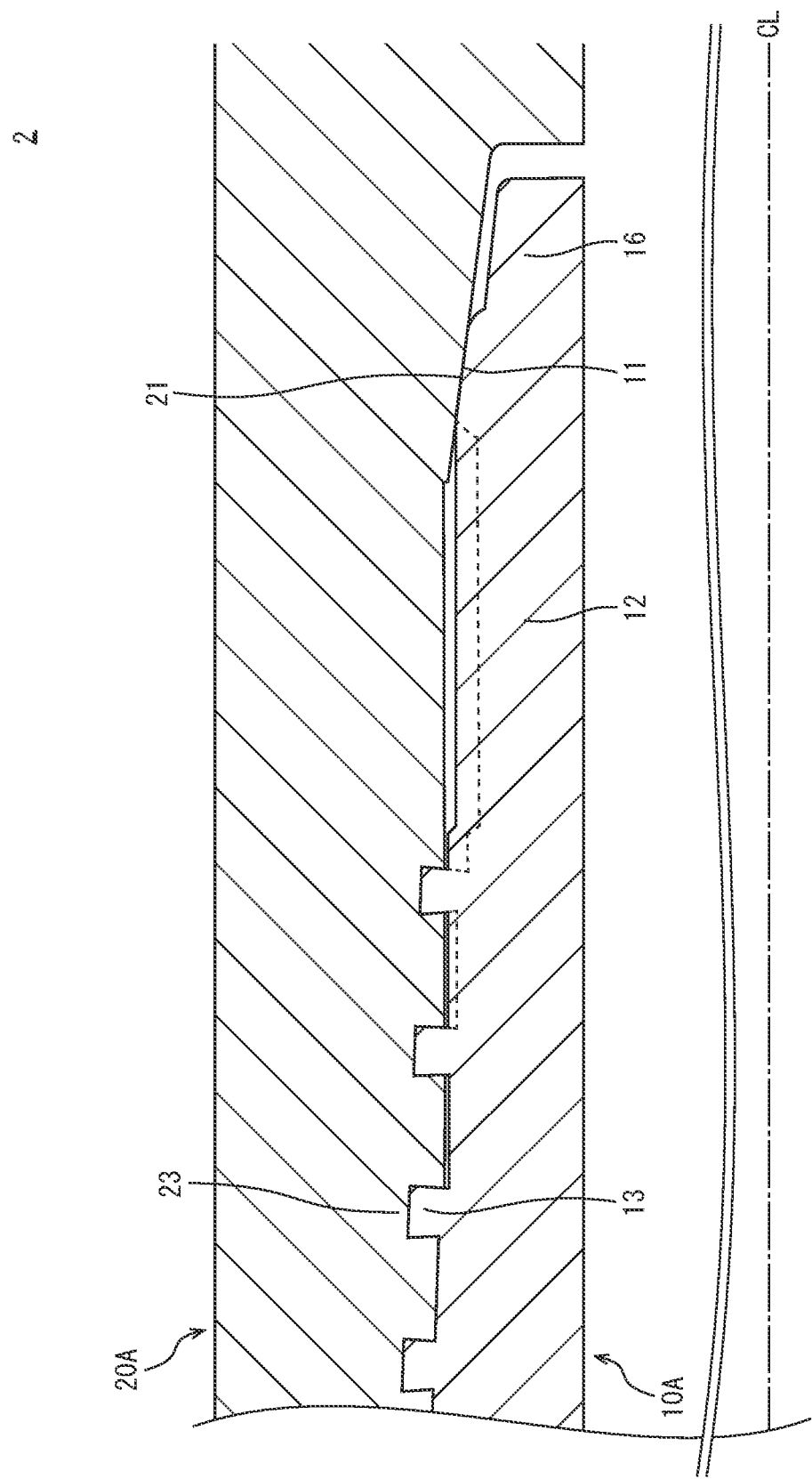
FIG. 5 is an enlarged vertical cross-sectional view of the inward end portion, as determined along the pipe-axis direction, of a threaded connection for steel pipe according to a variation of the above-mentioned embodiment.
Figure 6:
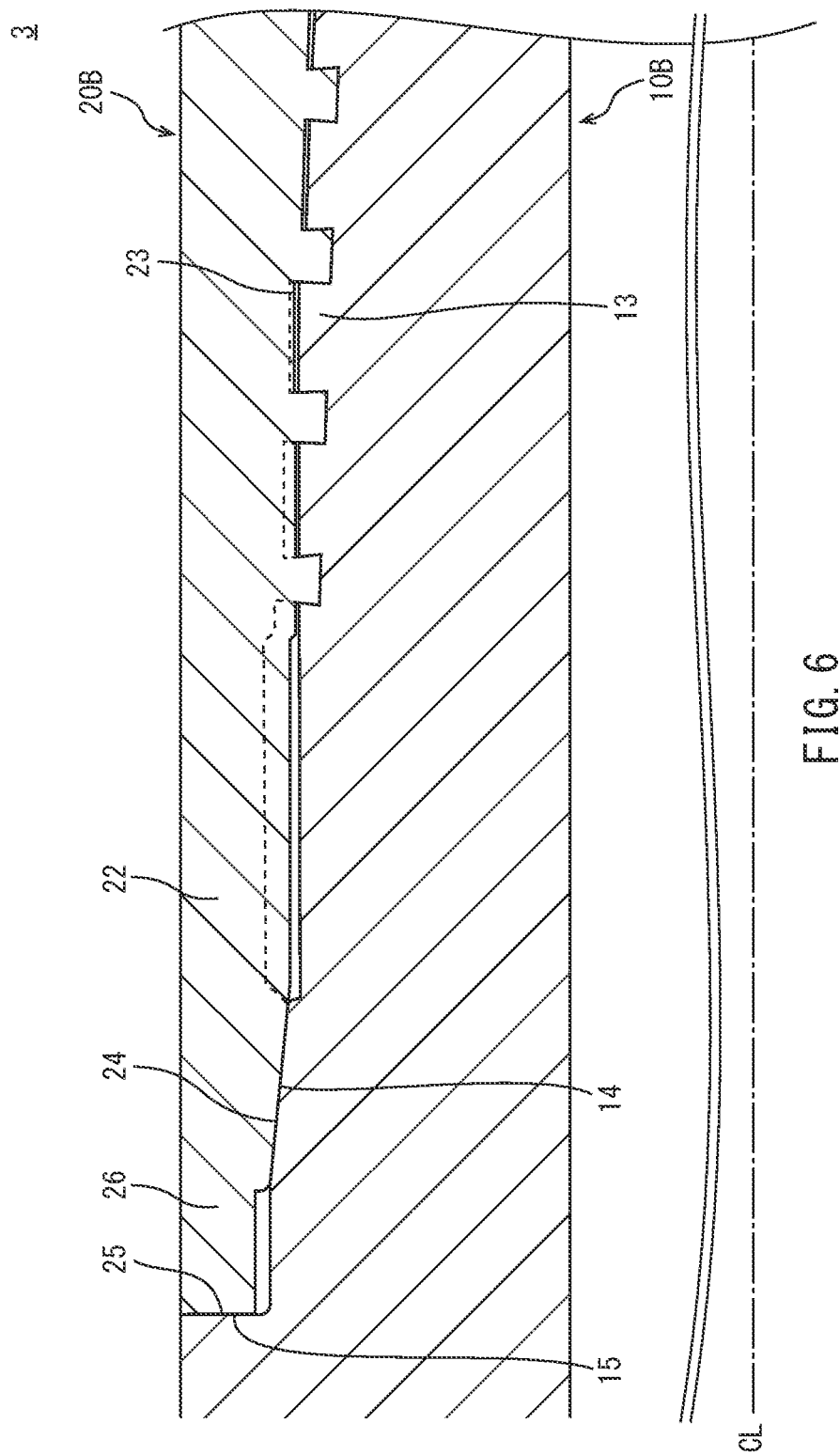
FIG. 6 is an enlarged vertical cross-sectional view of the outward end portion, as determined along the pipe-axis direction, of a threaded connection for steel pipe according to another variation.

FIG. 5 is an enlarged vertical cross-sectional view of the inward end, as determined along the pipe-axis direction, of the threaded connection 2 for steel pipe according to a variation of the above-described embodiment. The threaded connection 2 for steel pipe is different from the threaded connection 1 for steel pipe according to the above-described embodiment in that the pin 10A includes a nose 16.

As shown in FIG. 5, the nose 16 is located on the inward-most portion of the pin lip 12 as determined along the pipe-axis direction. The nose 16 is located between the tip surface of the pin 10A and the first seal surface 11 of the pin 10A. Although not shown, a shoulder surface similar to that of the above-described embodiment may be provided on the outward ends of the pin 10A and box 20A as determined along the pipe-axis direction; alternatively, no shoulder surface may be provided.

When assembled, the outer periphery of the nose 16 is not in contact with the box 20A. Providing the nose 16 on the pin 10A increases the stiffness of the pin lip 12. This will further improve sealing performance against the internal pressure.

FIG. 6 is an enlarged vertical cross-sectional view of the outward end, as determined along the pipe-axis direction, of the threaded connection 3 for steel pipe according to a variation of the above-described embodiment. The threaded connection 3 for steel pipe is different from the threaded connection 1 for steel pipe according to the above-described embodiment in that the box 20B includes a nose 26.

As shown in FIG. 6, the nose 26 is located on the outward-most portion of the box lip 22 as determined along the pipe-axis direction. The nose 26 is located between the second seal surface 24 of the box 20B and the shoulder surface 25 of the box 20B. That is, the shoulder surface 25 is provided on the tip of the nose 26.

When assembled, the shoulder surface 25 of the box 20B is in contact with the shoulder surface 15 of the pin 10B, similar to the shoulder surface of the above-described embodiment, but the inner periphery of the nose 26 is not in contact with the pin 10B. Providing this nose 26 on the box 20B increases the stiffness of the box lip 22. This will further improve sealing performance against the external pressure.

The circumferential tensile yield strength of the box lip 22 including the nose 26 and second seal surface 24 of the box 20B may be increased by cold expansion forming, for example. The circumferential tensile yield strength at the nose 26 and second seal surface 24 is preferably increased by at least 5% relative to the tensile yield strength of the steel-pipe body, and more preferably increased by 10% or more.

FIGS. 5 and 6 show implementations where a nose is provided on the pin or box. However, noses may be provided on both the pin and box.

Figure 7:
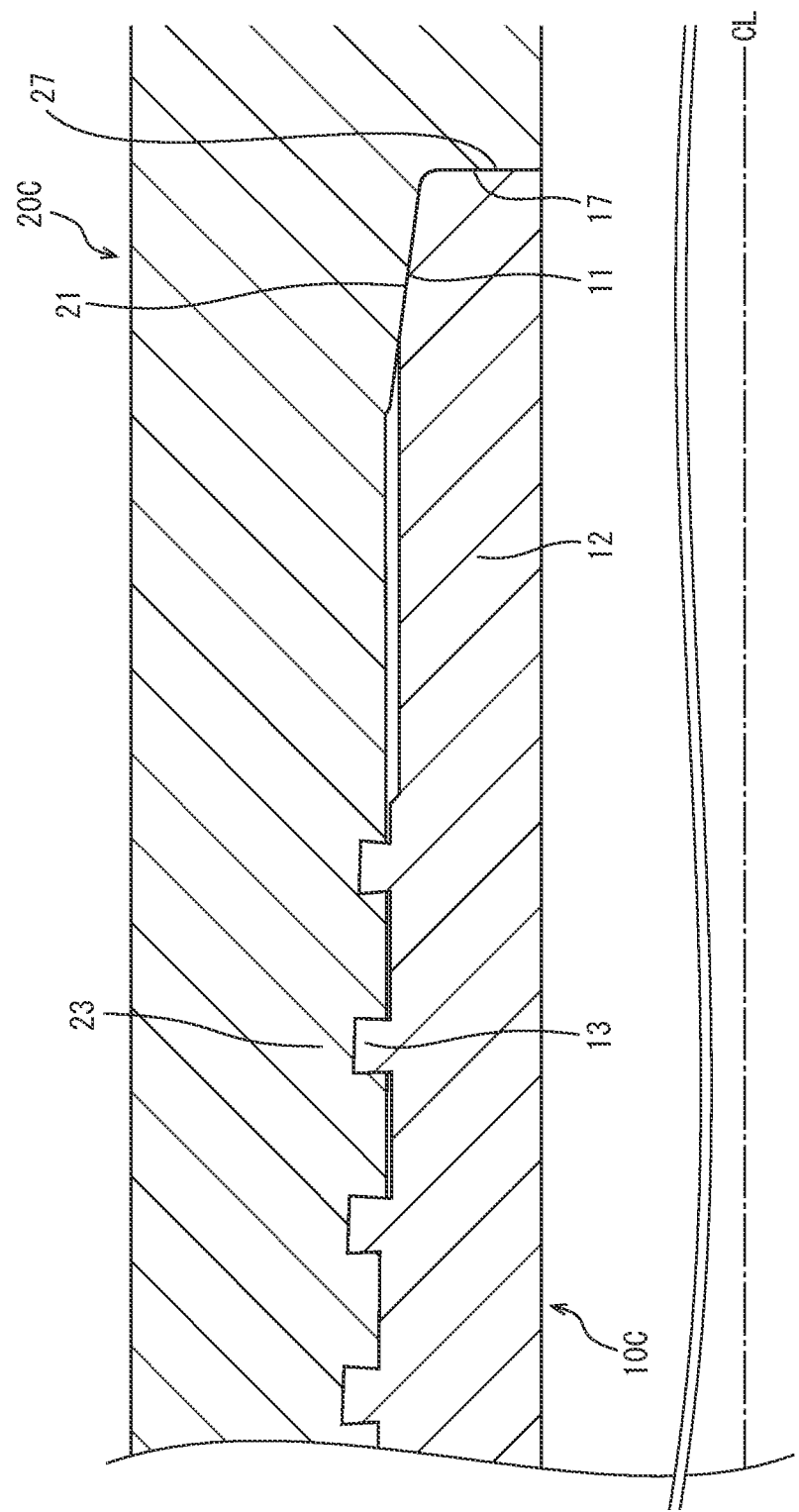
FIG. 7 is an enlarged vertical cross-sectional view of the inward end portion, as determined along the pipe-axis direction, of a threaded connection for steel pipe according to yet another variation.

Although no shoulder surface is provided on the tip of the pin of the above-described embodiment, a shoulder surface 17 may be provided on the tip of the pin 10, as shown in FIG. 7. The box 20C includes a shoulder surface 27 corresponding to the shoulder surface 17 of the pin 10C. When assembled, the shoulder surface 17 of the pin 10 is in contact with the shoulder surface 27 of the box 20. A shoulder surface similar to that of the above-described embodiment may be provided on the end surface of the pin 10C close to the steel-pipe body, or no such shoulder surface may be provided. A pin shoulder surface may be provided on one or both of the tip of the pin and the end surface thereof close to the steel-pipe body. The box includes a shoulder surface or shoulder surfaces corresponding to the shoulder surface (s) of the pin.

Figure 8:
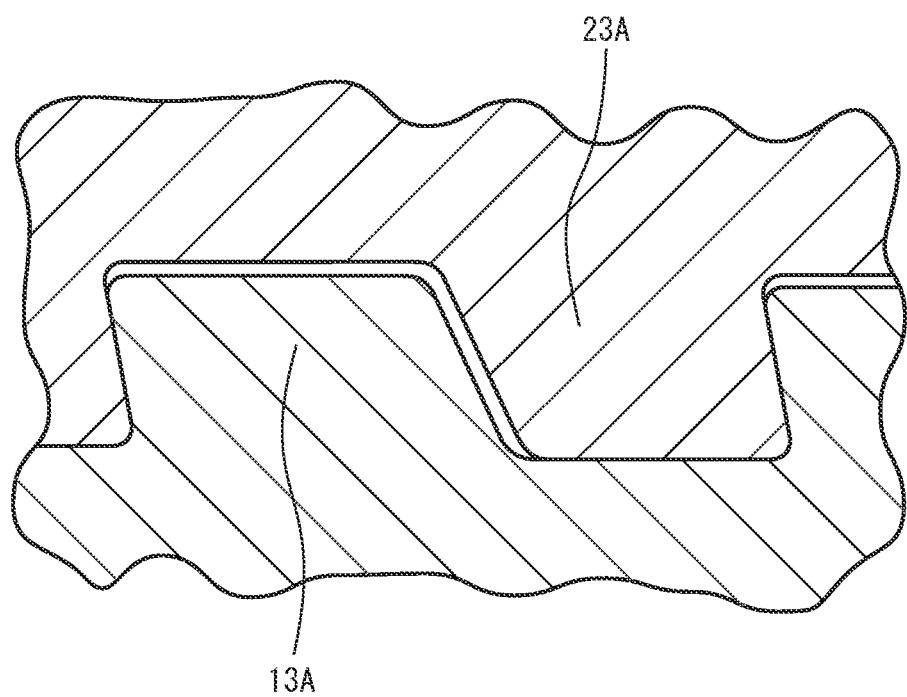
FIG. 8 is an enlarged vertical cross-sectional view of the threads of a threaded connection for steel pipe according to still another variation.

In the above-described embodiment, the thread assembly is composed of dove-tailed threads; however, the configuration of the thread assembly is not limited thereto. For example, as shown in FIG. 8, the male thread 13A (13) and female thread 23A (23) may be trapezoidal threads. Although not shown, also in this implementation, the male thread 13A (13) includes, near the inward end as determined along the pipe-axis direction, a plurality of thread root surfaces extending parallel to the pipe axis CL and having the same diameter, and the female thread 23A (23) includes, near the outward end as determined along the pipe-axis direction, a plurality of thread root surfaces extending parallel to the pipe axis CL and having the same diameter.

Examples

To determine the effects of the threaded connection for steel pipe according to the present disclosure, numerical simulation analysis was conducted by using elastic-plastic finite element method.

<Test Conditions>

Figure 9:
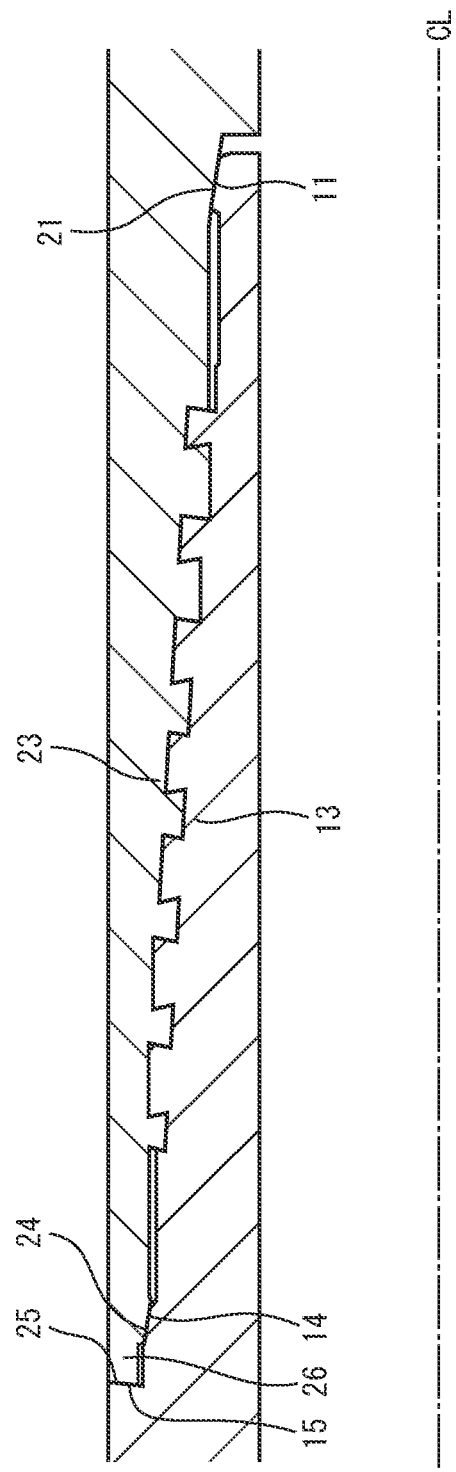
FIG. 9 is a vertical cross-sectional view of a model of a threaded connection for steel pipe according to an inventive example and comparative example.

As shown in FIG. 9, the model of a threaded connection for steel pipe used in the elastic-plastic finite element analysis included an inner seal portion composed of first seal surfaces 11 and 21, an outer seal portion composed of second seal surfaces 14 and 24, a shoulder portion composed of shoulder surfaces 15 and 25, and a nose 26 provided between the outer seal portion and shoulder portion. The models of the inventive example and comparative example described below have the same basic construction.

Figure 10:
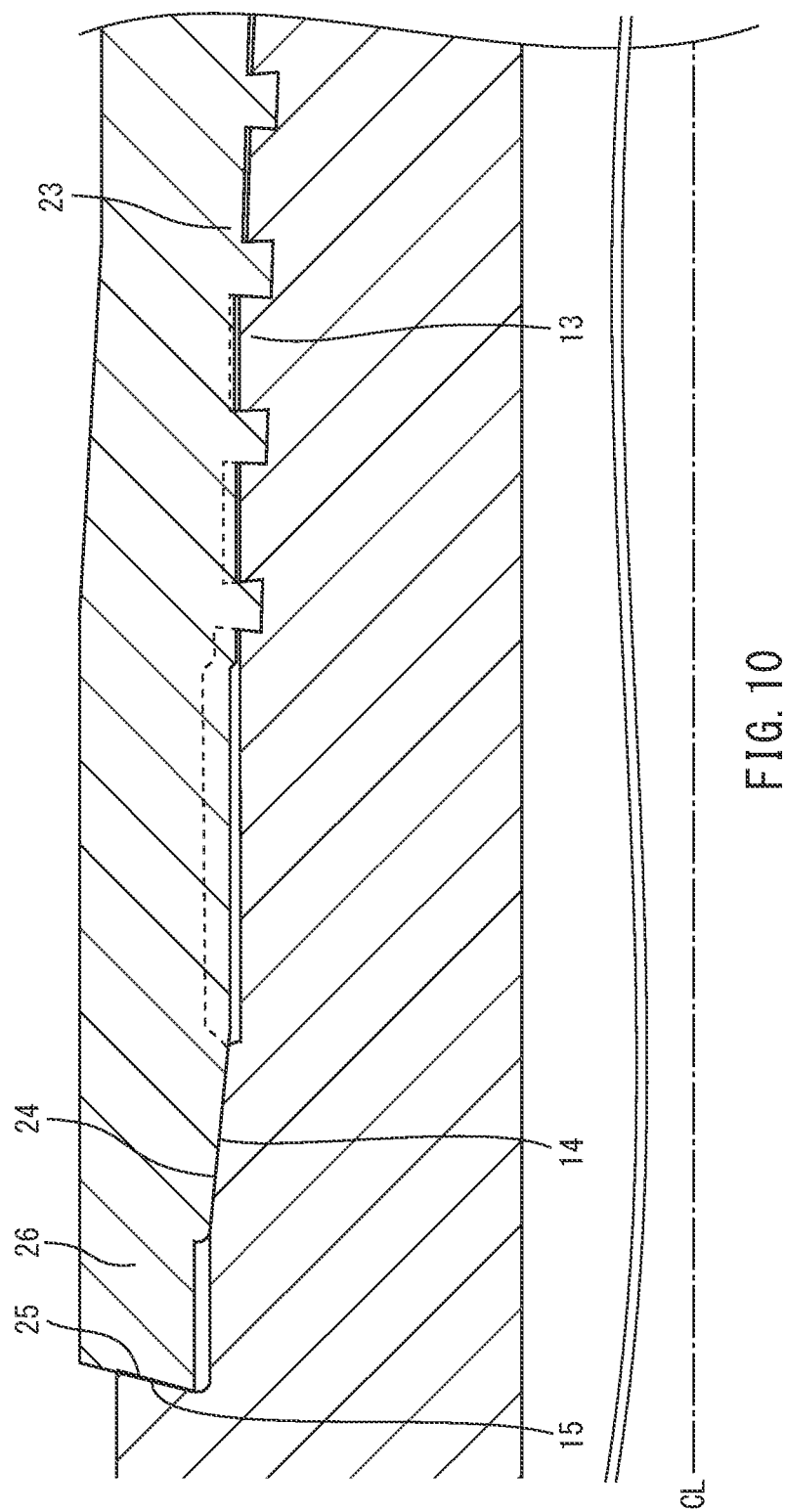
FIG. 10 is an enlarged vertical cross-sectional view of the outward end portion, as determined along the pipe-axis direction, of the model of the threaded connection for steel pipe shown in FIG. 9.

A model was created by applying the techniques of the present disclosure to a threaded connection having this basic construction to serve as the inventive example. That is, as shown in FIG. 10, near the outward end of the thread assembly as determined along the pipe-axis direction, the thread root surfaces of the female thread 23 and the corresponding thread crest surfaces of the male thread 13 extended parallel to the pipe axis CL. Although not shown, near the inward end of the thread assembly as determined along the pipe-axis direction, the thread root surfaces of the male thread 13 and the corresponding thread crest surfaces of the female thread 23 extended parallel to the pipe axis CL. The wall thickness of the pin lip was 6.11 mm and the wall thickness of the box lip was 7.19 mm.

In the inventive example, the distance between the male thread 13 and the inner seal portion as measured in the pipe-axis direction was two times the thread pitch. The distance between the female thread 23 and outer seal portion as measured in the pipe-axis direction was also two times the thread pitch.

A model was created having the above-described basic construction to which the techniques of the present disclosure was not applied to illustrate a conventional technique for comparison (comparative example). The construction of the outward end of the model of the comparative example as determined along the pipe-axis direction is indicated by broken lines in FIG. 10. In the model of the comparative example, the wall thickness of the pin lip was 4.98 mm and the wall thickness of the box lip was 5.98 mm.

The test conditions common to the inventive and comparative examples are as follows:

Dimensions of the steel pipe: 14 [inch], 115 [lb/ft] (with a nominal outer diameter of φ355.6 mm and a nominal wall thickness of 20.63 mm)

Steel pipe grade: Q125 in accordance with the API standards (carbon steel for oil country tubular goods specified by API 5CT, with a yield strength of 125 ksi (862 N/mm$^2$))

Figure 11:
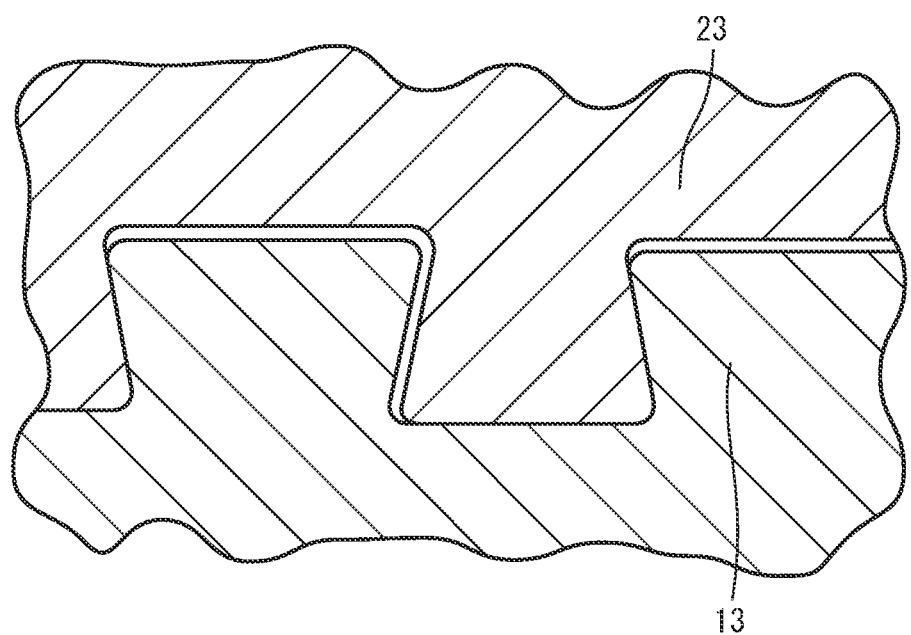
FIG. 11 is an enlarged vertical cross-sectional view of the threads of the model of the threaded connection for steel pipe shown in FIG. 9.

Shape and dimensions of the thread: dove-tailed (see FIG. 11); the thread ridge width and thread groove width varying along the direction of advancement of screw-in; clearances present between the thread crest surfaces of the male thread and the root surfaces of the female thread and between the stabbing surfaces when assembled; with a thread height of about 2 mm, a thread pitch of 8.47 mm, a thread taper of 1/10; single-start thread Distances between the thread portion and the inner and outer seal portions: 19 mm Length of the nose as measured in the pipe-axis direction: 20 mm <Evaluation Method>

In the elastic-plastic finite element analysis, for each of the models created, shouldering (meaning the shoulder surfaces 15 and 25 abutting each other) occurred and further screw-in occurred by 0.001 inches in the pipe-axis direction, and load combinations modelling the Series A test of ISO 13679: 2002 (repeated internal pressure and external pressure load test at ambient temperature) were sequentially applied. The minimum values of contact force on the inner and outer seal surfaces during this analysis process were compared, where relative values were used relative to the value of the comparative example, which was represented as one (1). The analysis results were shown in Table 1.

TABLE 1

| Item | | Comp. Ex. | Inv. Ex. |
| --- | --- | --- | --- |
| Wall thickness of box lip [mm] | | 5.98 | 7.19 |
| Wall thickness of pin lip [mm] | | 4.98 | 6.11 |
| Minimum value of contact force on seal of ISO Series A analysis process* | Inner seal portion | 1 | 1.3 |
| | Outer seal portion | 1 | 2.4 |

*Relative values are shown relative to the value of the comparative example, which is represented as 1.

As shown in Table 1, the contact forces on the inner and outer seal surfaces of the inventive example are much higher than the contact forces on the inner and outer seal surfaces of the comparative example. This demonstrates that, in the threaded connection for steel pipe according to the present disclosure, the wall thicknesses of the pin lip and box lip are larger than those for the conventional art, resulting in a good sealing performance against the external and internal pressures.

What is claimed is:

1. A threaded connection for steel pipe including a tubular pin and a tubular box, the tubular pin and the box being assembled as the pin is screwed into the box, wherein:

the pin includes, beginning with its tip toward the body of the steel pipe, a pin lip including a first seal surface, a male thread constituted by a single-stage tapered thread, and a second seal surface, the box includes a first seal surface corresponding to the first seal surface of the pin, a female thread constituted by a single-stage tapered thread corresponding to the male thread, and a box lip including a second seal surface corresponding to the second seal surface of the pin, when assembled, the first seal surfaces are in contact with each other and the second seal surfaces are in contact with each other, a portion of the male thread located near an end thereof close to the pin lip includes a plurality of thread root surfaces extending parallel to a pipe axis and having the same diameter, and a portion of the female thread located near an end thereof close to the box lip includes a plurality of thread root surfaces extending parallel to the pipe axis and having the same diameter.

2. The threaded connection for steel pipe according to claim 1, wherein:

the pin further includes a shoulder surface provided on at least one of the tip and an end surface close to the body of the steel pipe, the box further includes a shoulder surface corresponding to the shoulder surface of the pin, and the corresponding shoulder surfaces are in contact with each other when assembled.

3. The threaded connection for steel pipe according to claim 1, wherein the pin further includes a nose located between a tip surface and the first seal surface of the pin.

4. The threaded connection for steel pipe according to claim 1, wherein the box further includes a nose located between an end surface corresponding to an end surface of the pin close to the steel-pipe body and the second seal surface of the box.

5. The threaded connection for steel pipe according to claim 1, wherein a thread assembly including the male thread and the female thread has a dove-tailed thread shape and a thread width changing along a lead.

6. The threaded connection for steel pipe according to claim 1, wherein a thread assembly including the male thread and the female thread has a single-start or double-start thread form.

* * * * *